United States Patent
Corbett (10) Patent No.: US 8,230,039 B2
(45) Date of Patent: Jul. 24, 2012

(54) SYSTEMS AND METHODS FOR ACCELERATED PLAYBACK OF RICH INTERNET APPLICATIONS

(75) Inventor: James Corbett, Berkeley, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 585 days.

(21) Appl. No.: 12/104,248

(22) Filed: Apr. 16, 2008

(65) Prior Publication Data

US 2009/0265367 A1  Oct. 22, 2009

(51) Int. Cl.
*G06F 15/16* (2006.01)
(52) U.S. Cl. ....................................................... 709/217
(58) Field of Classification Search .................. 709/217, 709/232–233
See application file for complete search history.

(56) References Cited

U.S. PATENT DOCUMENTS

| | | | | |
|---|---|---|---|---|
| 6,101,274 A * | 8/2000 | Pizano et al. | | 382/176 |
| 7,162,531 B2 * | 1/2007 | Paz et al. | | 709/231 |
| 7,234,133 B2 | 6/2007 | Klein | | |
| 7,328,275 B1 * | 2/2008 | Perttunen | | 709/235 |
| 2002/0069263 A1 | 6/2002 | Sears et al. | | |
| 2004/0237063 A1 | 11/2004 | Klein | | |
| 2005/0010860 A1 * | 1/2005 | Weiss et al. | | 715/500.1 |
| 2005/0038796 A1 | 2/2005 | Carlson et al. | | |
| 2005/0138674 A1 * | 6/2005 | Howard et al. | | 725/136 |
| 2007/0006080 A1 * | 1/2007 | Finger et al. | | 715/719 |
| 2007/0204052 A1 * | 8/2007 | Abramson | | 709/217 |
| 2007/0208834 A1 * | 9/2007 | Nanamura et al. | | 709/220 |
| 2009/0089677 A1 * | 4/2009 | Chan | | 715/719 |

OTHER PUBLICATIONS

Thiele, D. et al., Making the Model React, ISA, web page available at http://www.isa.org/InTechTemplate.cfm?Section=Article_Index1 &template, as available via the internet and printed Feb. 6, 2009.
Anagnostopoulos, D. et al., Experiment Scheduling in Faster-than-Real-Time Simulation, Department of Informatics, University of Athens, Panepistimiopolis, Athens Greece, 2002.

* cited by examiner

*Primary Examiner* — Jason Recek
(74) *Attorney, Agent, or Firm* — Kilpatrick Townsend & Stockton LLP (57) ABSTRACT

Embodiments of systems and methods for accelerated playback of rich internet applications are disclosed. For example, one embodiment of the present invention includes a method having the steps of determining a frame rate associated with a rich internet application, the rich internet application comprising a plurality of frames; determining at least one timing signal to be generated by the rich internet application; and determining at least one frame at which the timing signal would be output at the frame rate. The method further includes generating each of the plurality of frames of the rich internet application at a rate greater than the frame rate; and outputting the at least one timing signal when the at least one frame associated with the timing signal is generated. In another embodiment, a computer-readable media includes code for a carrying out such a method.

26 Claims, 6 Drawing Sheets

SYSTEMS AND METHODS FOR ACCELERATED PLAYBACK OF RICH INTERNET APPLICATIONS

FIELD OF THE INVENTION

This application generally relates to the playback of rich internet applications, and more specifically relates to systems and methods for accelerated playback of rich internet applications.

BACKGROUND

Since first becoming publicly available, the Internet and the World Wide Web have evolved dramatically. Web pages were initially available only with text, or text and images, and were typically hand-coded in Hypertext Markup Language (HTML) to be parsed and displayed by a web browser. In such early web pages, most or all of the content of the web page was explicitly recited within the HTML document, and was simply formatted for display by the web browser. With such pages, it was relatively simple for a search engine to extract information from web pages based on an examination of the web pages' source code. However, web pages have become increasingly more complex, and frequently do not explicitly include all of the coding necessary to render the content on the web page. In particular, coding for rich internet applications (RIAs) may not be included within the web page, but instead may be loaded by a playback routine from a remote server.

As such, performing searches on RIAs can be difficult as there may be no effective way to search the content of the RIA at a practical rate. While it may be possible to step through the RIA at its native frame rate, this can take a significant amount of time, particularly for RIAs having long animated sequences.

SUMMARY

Embodiments of the present invention provide systems and methods for accelerated playback of rich internet applications. For example, one embodiment of the present invention comprises a method having the steps of determining a frame rate of a rich internet application, the rich internet application comprising a plurality of frames; determining at least one timing signal to be generated by the rich internet application; determining at least one frame at which the timing signal would be output at the frame rate. The method further comprises generating each of the plurality of frames of the rich internet application at a rate greater than the frame rate; generating the at least one timing signal; and outputting the at least one timing signal when the at least one frame associated with the timing signal is generated. In another embodiment, a computer-readable media comprises code for a carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for accelerated playback of rich internet applications.

Illustrative Accelerated Playback of Rich Internet Applications

Many modern web sites incorporate rich internet applications into the content available on the site, such as Abode® Flash™ animations or games. To catalog the content within a rich internet application ("RIA") for later searching, a search engine may parse each frame of the RIA and identify text fields or other content that can be parsed and classified for searching. Because some RIAs may contain lengthy animations or other frame sequences, it may be desirable to step through and analyze the RIA as quickly as possible One illustrative embodiment of the present invention is configured to analyze each frame within a RIA as fast as possible. The illustrative embodiment is configured to bypass any native frame rate limitations specified within the RIA and to execute the RIA as fast as possible. This illustrative embodiment is also configured to generate any timing signals or synchronization events specified within the RIA, at the correct time relative to the accelerated execution of the RIA.

This illustrative example is given to introduce the reader to the general subject matter discussed herein. The invention is not limited to this example. The following sections describe various additional embodiments of systems and methods for accelerated playback of rich internet applications.

Rich Internet Applications

A rich internet application (RIA) typically is a collection of content that is wrapped within programming code to be executed by a playback routine. For example, some rich internet applications may have a flash, or SWF, format and may comprise animations, interfaces, games, and/or other interactive or passive content. In addition, the RIA typically includes program code to instruct a playback routine (referred to as a "RIA player") how to display and progress through the content within the RIA. For example, Adobe® Flash™ is one type of RIA player, while the open-source Gnash software is another type of RIA player. However, other varieties of frame-based RIAs and RIA players are available or may become available.

A very simple RIA may comprise a single animation that begins at its first frame, runs through to the last frame, and exits. More complex RIAs may comprise a plurality of animations, user interfaces, and interactive games.

Figure 1:
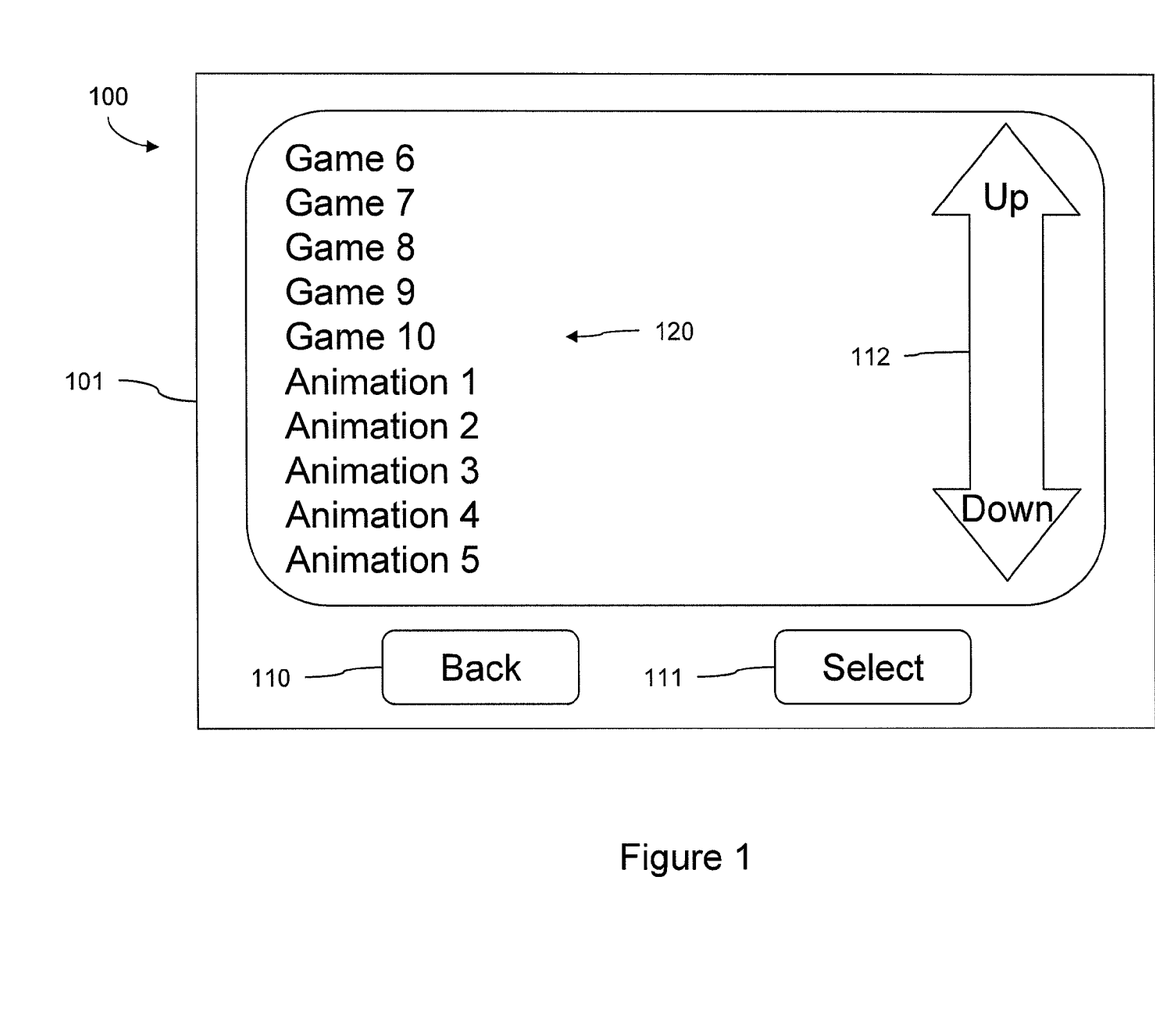
FIG. 1 is a screen shot showing a main menu screen of a RIA according to one embodiment of the present invention.

Referring now to FIG. 1, FIG. 1 is a screen shot showing a main menu screen of a RIA according to one embodiment of the present invention. In one illustrative embodiment of the present invention, a RIA 100 comprises a rich internet application in a SWF file format. The RIA 100 comprises games and animations, as well as menus to navigate the RIA 100. The RIA 100 shown in FIG. 1 comprises a plurality of frames that can be output in a specified order, or according to an input. For example, animations within the RIA 100 are executed in sequential order at a frame rate specified in the RIA 100. But, interactive games within the RIA 100 may display frames in an order based on the user's input, such as by selecting options within the game, and by playing the game itself.

Because the RIA 100 has different options, there are different branches within the RIA that may be selected by a user. Such a RIA comprises a tree structure describing the arrangement of frames or groups of frames within the RIA. Inputs received by the RIA may cause the RIA to traverse down one branch of the tree or another, and to output frames associated with each traversed branch in the tree.

In addition to the content within the RIA 100, RIA 100 also comprises additional information. For example, a RIA having an animation or other frame sequence may also include a frame rate, a timing signal for communicating with the RIA player, or other signals to cause events within the RIA to occur. A RIA player may examine information, such as a frame rate, to determine how to playback the RIA, and may interpret signals received from the RIA to indicate playback is proceeding correctly or to cause other content to be invoked.

In the RIA 100 shown in FIG. 1, the RIA 100 comprises a plurality of animations. To configure a RIA player to properly playback animations sequences, the RIA 100 comprises a plurality of frame rates for the different animations embedded within the RIA 100. The RIA also comprises a plurality of timing signals associated with the animations. In some embodiments of the present invention, the timing signals within the RIA are not generated based on a frame rate, but are generated asynchronously to the execution of the RIA. For example, a timing signal may occur every 50 ms, regardless of a specified frame rate of within the RIA.

As a part of each of the animations, games, and interfaces, the RIA comprises a plurality of frames that may be generated. During playback of the RIA, the RIA player may output frames within the RIA in a particular order, such as by playing the frames of an animation in sequence. Alternatively, the RIA player may generate the frames in an order specified by user input. For example, the RIA may first display a menu frame to allow a user to select how to playback the frames within the RIA 100. The RIA player may then advance to a different frame within the RIA 100 based on the user's selection.

For example, the main menu frame 101 of the RIA 100 displays textual information in a menu 120, as well as interface elements, such as buttons 110, 111 and a scroll bar 112. The RIA 100 shown in FIG. 1 allows a user to scroll through a menu of animations and games by using the scroll bar 112. When a user desires to view one of the animations, or to play one of the games, the user may select the desired menu item, and press the 'Select' button 111. The RIA 100 will then display the animation for the user, or allow the user to play the game. Alternatively, a search engine attempting to parse the RIA 100 for searchable text may identify all of the textual fields on the menu 120, and then attempt to select and parse each of the available animations and games by traversing the tree structure of the RIA 100.

Figure 2:
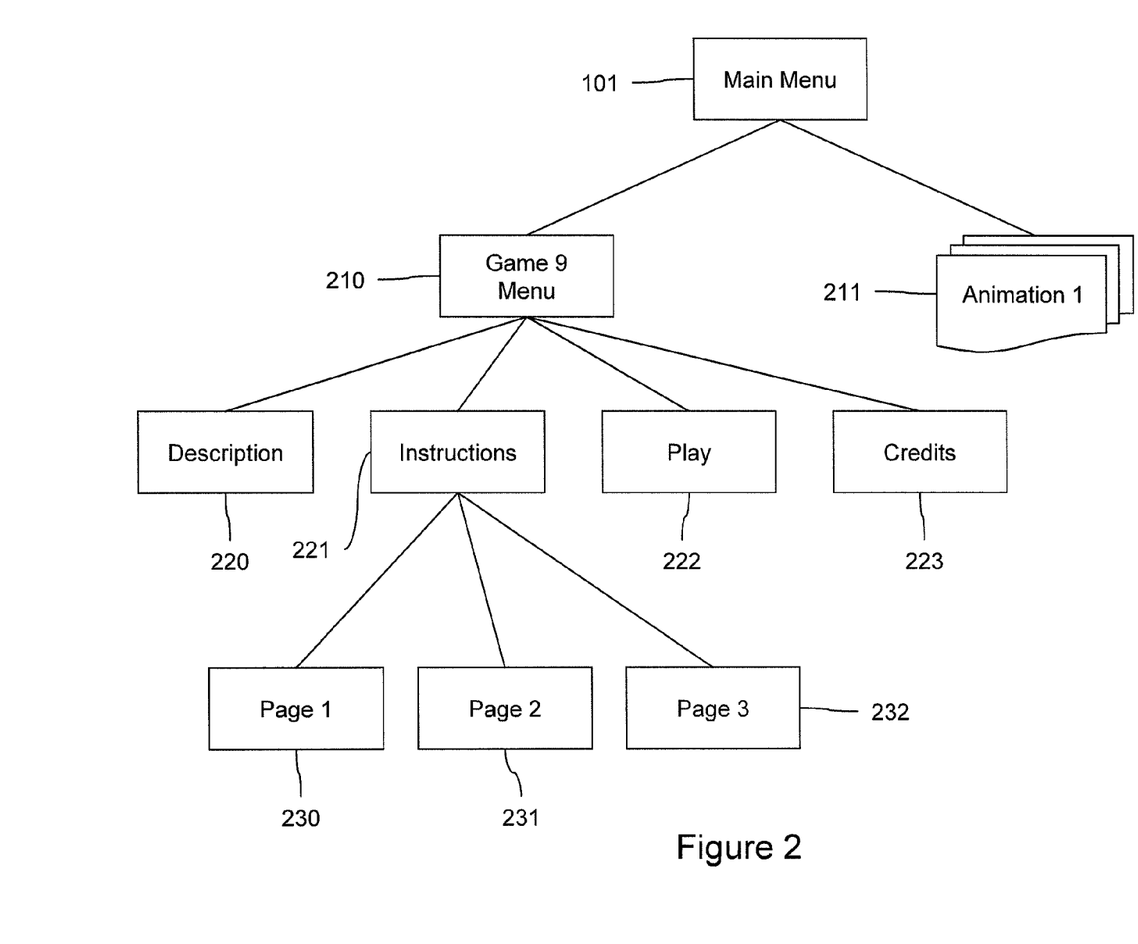
FIG. 2 shows a block diagram of a part of a tree structure of the RIA of FIG. 1 according to one embodiment of the present invention.

FIG. 2 shows a block diagram of a part of a tree structure of the RIA 100 of FIG. 1 according to one embodiment of the present invention. A tree comprises a plurality of branches which connect the nodes within the tree. Each node in the tree shown in FIG. 2 comprises a frame or frames of the RIA. For example, main menu node 101 comprises a single frame, the main menu screen, while node 211 comprises all of the frames associated with Animation 1. When the main menu screen 101 is displayed to the user, the user may select one of the items available in the menu. In response to receiving the selection of an item, the RIA player traverses the tree 200 to the node having the selected content.

For example, from the main menu screen 101, a user may select Game 9, which causes the RIA player to traverse the tree to the Game 9 Menu node 210. From here the user may attempt to select each of the four menu options: a description 220 of the game, instructions 221 for the game, play 222 the game, or see the credits 223 for the game. Each of these menu options may lead to additional screens, for example, the instructions menu option 221 allows the search engine to retrieve three pages 230-232 of instruction information about the game. And each of these screens may include an animation that comprises a plurality of frames.

Once the user has finished playing the game, the user may return to the main menu block 101, and then select Animation 1 211. The RIA player then plays the animation 211.

However, conventional RIA players play animations at their normal play speed. While logical for a RIA player used by a user, search engines generally attempt to quickly catalog data about web content, which, for long animations, may cause excessively long times to catalog information about the RIA. However, embodiments of the present invention, may allow accelerated playback of animations or other frame-by-frame sequences, while allowing a search engine to extract searchable items from each frame of such animations or sequences.

Accelerated Playback of Rich Internet Applications

Figure 3:
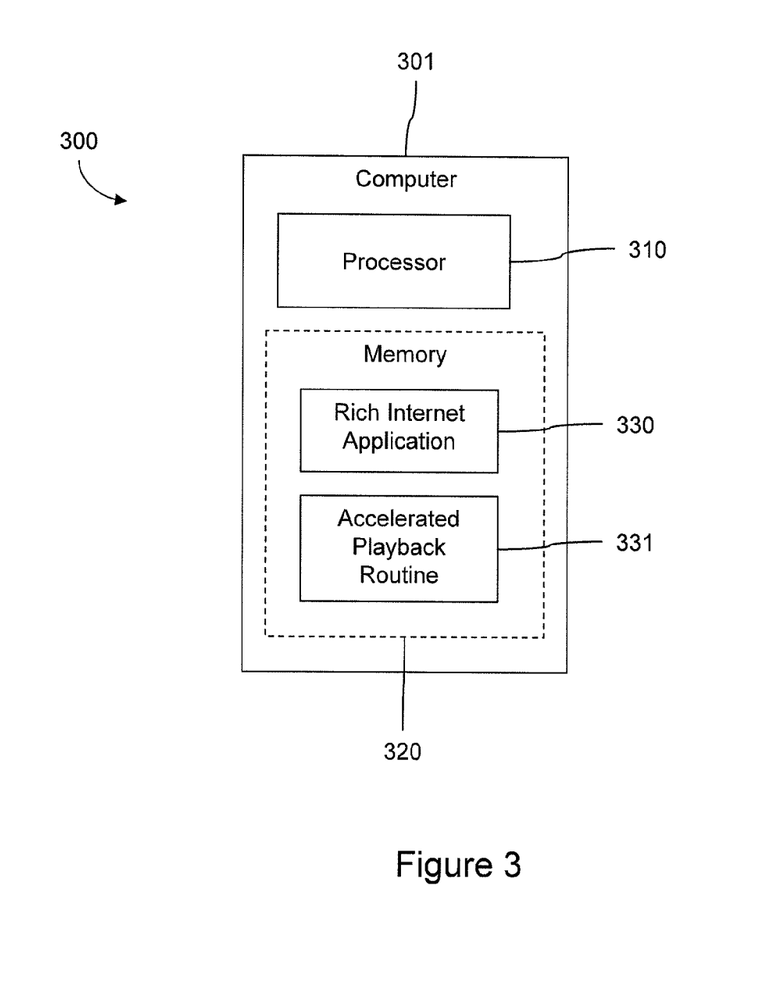
FIG. 3 shows a block diagram for a system for accelerated playback of RIAs according to one embodiment of the present invention.

FIG. 3 shows a system 300 for accelerated playback of RIAs according to one embodiment of the present invention. The system 300 comprises a computer 301 having a processor 310 and a memory 320. Within the memory, the computer has a RIA 330 and an accelerated playback routine 331.

The accelerated playback routine 331 is configured to read the RIA 330 as input and to play the RIA 330. The accelerated playback routine 331 is configured to step through the frames of the RIA 330, including traversing any menu options, and to process and output each frame. However, the accelerated playback routine 331 is configured to execute the RIA 330 at an accelerate rate without regard to the RIA's native frame rate. By bypassing the native frame rate, the accelerated playback routine may be able to parse the frames of the RIA at an accelerated rate. For example, if the RIA 330 comprises an animation having 1,200 frames and a native frame rate of 30 frames per second, the animation would run its course in 40 seconds. However, by bypassing the native frame rate, the accelerated playback routine may be able to parse and output each frame at a higher rate, potentially allowing a search engine, or other program, to analyze the contents of the RIA more quickly than by analyzing the RIA at its native frame rate.

For example, the system 300 may generate the frames at a rate limited by the speed of the system 300 and the availability of resources within the system 300 (herein referred to as "as fast as possible"). For example, the system 300 may generate a first frame of the animation and the immediately begin processing the second frame of the animation, thus attempting to execute and/or playback the RIA as fast as possible. In a similar embodiment, the system 300 may generate subsets of the frames of a RIA at an accelerated rate, such as at the request of another application. For example, a search engine may request that the system 300 generate 30 frames and then wait for the next request.

However, accelerated playback of a RIA may be complicated by internal characteristics of the RIA. For example, many RIAs incorporate internal synchronization mechanisms or timing devices. These synchronization mechanisms or timing devices may operate independently of the frame rate. If a RIA is accelerated at a fixed or arbitrary rate, those synchronization mechanisms or timing devices may not function properly and the RIA may not generate the proper output, or the RIA may not function at all. Thus, accelerated playback of a RIA may require additional considerations, such as generating timing signals at the appropriate time in relation to the rendered content, regardless of the playback speed. Some embodiments of the present invention accommodate such synchronization mechanisms and timing devices embedded within a RIA.

Figure 4:
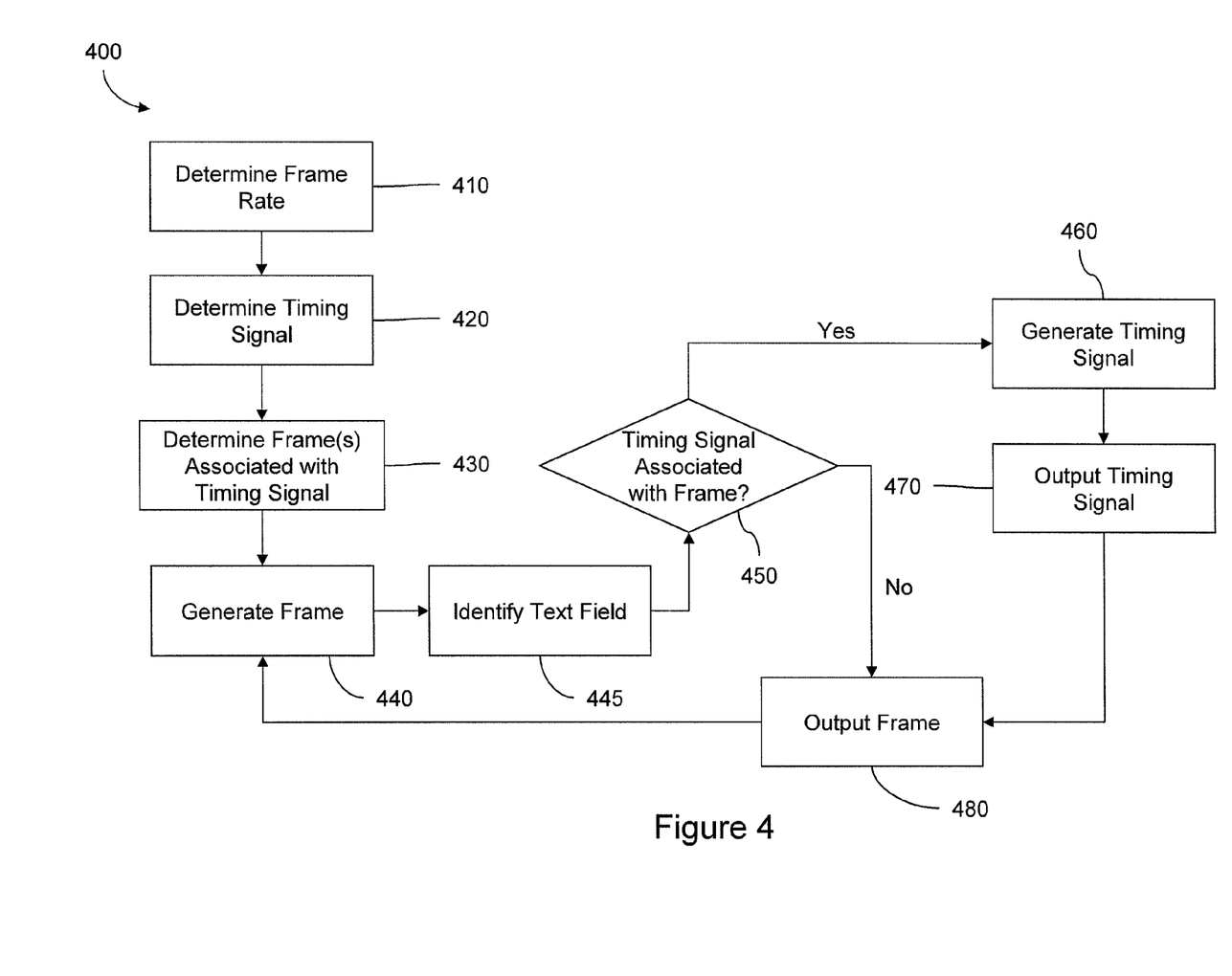
FIG. 4 shows a flowchart describing a method for accelerated playback of a rich internet application according to one embodiment of the present invention.

Referring now to FIG. 4, FIG. 4 shows a flowchart describing a method for accelerated playback of a rich internet application according to one embodiment of the present invention. The description of FIG. 4 will be given with reference to the system 300 shown in FIG. 3. In the embodiment shown, the RIA comprises one animation, however, embodiments may comprise RIAs having a plurality of animations, such as the ones described above. In such embodiments, the method shown in FIG. 4 may be applied to each animation.

In block 410, the system 300 determines a frame rate of a RIA. For example, a RIA comprising an animation may include a frame rate for the animation. The system 300 may determine the frame rate by, for example, reading a file comprising the RIA, or by sending a request or other signal to the RIA to request the frame rate. For example, a RIA may comprise a Flash™ animation. In such a case, the system 300 may determine the frame rate of the animation by requesting a frame rate from the RIA. For example, in one embodiment, the RIA comprises a Flash™ RIA. In such an embodiment, the system 300 may determine the frame rate of an animation by reading a frameRate value from the animation's Stage object.

In some embodiments, a RIA may comprise a plurality of frame rates. For example, a RIA may comprise a plurality of animations, wherein each animation has an associated frame rate. In the embodiment shown in FIG. 1, the RIA 100 comprises a plurality of animations, each of which comprises a frame rate. In a similar embodiment, each animation of a plurality of animations within a RIA comprises a different frame rate from the other animations.

In one embodiment of the present invention, the system 300 determines a frame rate of a RIA by reading data from a file comprising the RIA. For example, a file may comprise program code and data associated with a RIA. The system 300 may read the contents of the file and extract a frame rate associated with the RIA.

In block 420, the system 300 determines at least one timing signal to be generated by the application. A timing signal may comprise a one-time signal or a periodic signal. A one-time signal may be generated at a specific time during the animations. For example, a one-time signal may be generated to correspond with the midpoint of the animation sequence, or may be generated at a specific time during an animation.

A periodic timing signal may be generated at a fixed interval during the playback of an animation. For example, the system 300 may determine that a timing signal is to be generated by an animation every 500 milliseconds (ms). In such an embodiment, when the animation is running, approximately every 500 ms the animation may cause a timing signal to be generated and output.

In one embodiment of the present invention, the system 300 determines at least one timing signal to be generated by reading data from a file comprising the RIA. For example, a file may comprise program code and data associated with a RIA. The system 300 may read the contents of the file and extract data describing a timing signal associated with the RIA. Alternatively, the system 300 may receive a RIA from a remote computer, such as over a network connection as a part of a web page.

Data describing a timing signal may comprise a period, such as a number of frames or a time interval after which to output the timing signal. For example, in one embodiment, a timing signal may comprise data indicating a period of 10 frames. In such a case, the data indicates that the timing signal should be generated every 10 frames regardless of how much time has elapsed between timing signals. In another embodiment, a timing signal may comprise data indicating a period of 250 ms. In such a case, the data indicates that the timing signal should be generated every 250 ms, regardless of how many frames are generated between timing signals.

In block 430, the system determines at least one frame associated with the timing signal. As discussed above, if playback and/or execution of a RIA is accelerated, synchronization or timing mechanisms may not function properly. Thus, it may be necessary to generate signals corresponding to such mechanisms at different rates or times to correctly correlate with the accelerated playback and/or execution of the RIA.

For example, in one embodiment of the present invention, a RIA may comprise an animation having a frame rate of 30 frames per second (fps) and a timing signal having a period of 500 ms. The system 300 may determine that for accelerated playback a timing signal should be generated every 15 frames, regardless of the rate at which the RIA is executed or played back. In another embodiment of the present invention, determining at least one frame associated with the timing signal may comprise determining a frame associated with a one-time timing signal. For example, a one-time signal may be configured to execute 20 seconds into an animation sequence. In such an embodiment, the frame rate of the animation is 45 fps. Thus, a determination is made that the timing signal should be generated at frame 900 of the animation sequence.

Once a determination has been made, information correlating a timing signal with one or more frames may be stored. For example, in one embodiment, the system 300 may store information correlating a timing signal with one or more frames in a table in memory. The system 300 calculates the frame number of each frame associated with the timing signal, and stores the frame numbers in a table associated with the timing signal. Such a table may include a column identifying the signals and then additional columns with frame numbers for each signal identifying which frame or frames should cause the signal to be generated. Alternatively, the system may store the association between one or more frames and a timing signal by storing a frame interval representing the number of frames between timing signals. Such a frame interval may be used in coordination with a counter. The counter may be incremented each frame until it equals the frame interval, at which time, the signal may be generated and the counter may be reset.

In the embodiment shown in FIG. 4, blocks 440-480 represent processing done for a single frame of the RIA. Various embodiments of the present invention may perform blocks 440-480 at different rates and/or in different orders. For example, in the embodiment shown in FIG. 4, blocks 440-480 are performed as fast as possible. Another embodiment may perform steps 440-480 at double the frame rate. A further embodiment may perform steps 440-480 on a requested subset of the frames within a RIA at an accelerated rate or at a requested rate. Further, steps 410-480 need not be performed in the order specified. For example, in one embodiment of the present invention, determining whether a timing signal is associated with a frame (step 450) may occur before the frame is generated (step 440).

In block 440, the system 300 generates a frame of the rich internet application. In one embodiment of the present invention, generating a frame of the RIA may comprise identifying objects within the frame, for example text objects or graphical objects, calculating positions of objects within a frame, and/or loading information from a computer-readable medium, such as graphical information or text.

In block 445, at least one text field is identified in the generated frame. For example, a search engine may parse the generated frame to identify text fields in order to classify the RIA for later searching. Alternatively, the system 300 may output an identification of some or all of the text fields in a generated frame. It should be noted that block 445 is not necessary for accelerated playback, however, it can allow a search engine to extract fields for use in categorizing content in a RIA.

In block 450, the system 300 determines whether a signal is associated with the generated frame. For example, in one embodiment of the present invention, the system may search a table describing an association between frame numbers and a timing signal. In one embodiment, the system 300 may decrement a counter representing a number of frames between timing signals. When the counter reaches 0, the system 300 may determine that a timing signal is associated with the generated frame. The system 300 may then reset the counter. A related embodiment may increment a counter until an interval value is reached. The system 300 may then determine that a timing signal is associated with the generated frame. The system 300 may then reset the counter to 0. If the system 300 determines that a timing signal is not associated with the frame, the method proceeds to block 460. If the system 300 determines that a timing signal is associated with the frame, the method proceeds to block 470.

In block 460, the system 300 generates a timing signal associated with the frame, and in block 470, the system 300 outputs the timing signal. For example, the system 300 may output the timing signal to an event handler or other routine designated for the timing signal.

In block 480, the system 300 outputs the frame. For example, in one embodiment, the system may display the frame on a display in communication with the computer 301. In another embodiment, the system 300 may output the frame to memory 320. In a further embodiment, the system 300 may output the frame to another application, such as a search engine, for analysis. For example, the system 300 may transmit the frame to a search engine which may then analyze the frame for text fields or other searchable content. In one embodiment of the present invention, the system 300 outputs the timing signal and the frame to different destinations. After the frame has been output, the method returns to block 440 to generate the next frame.

Figure 5:
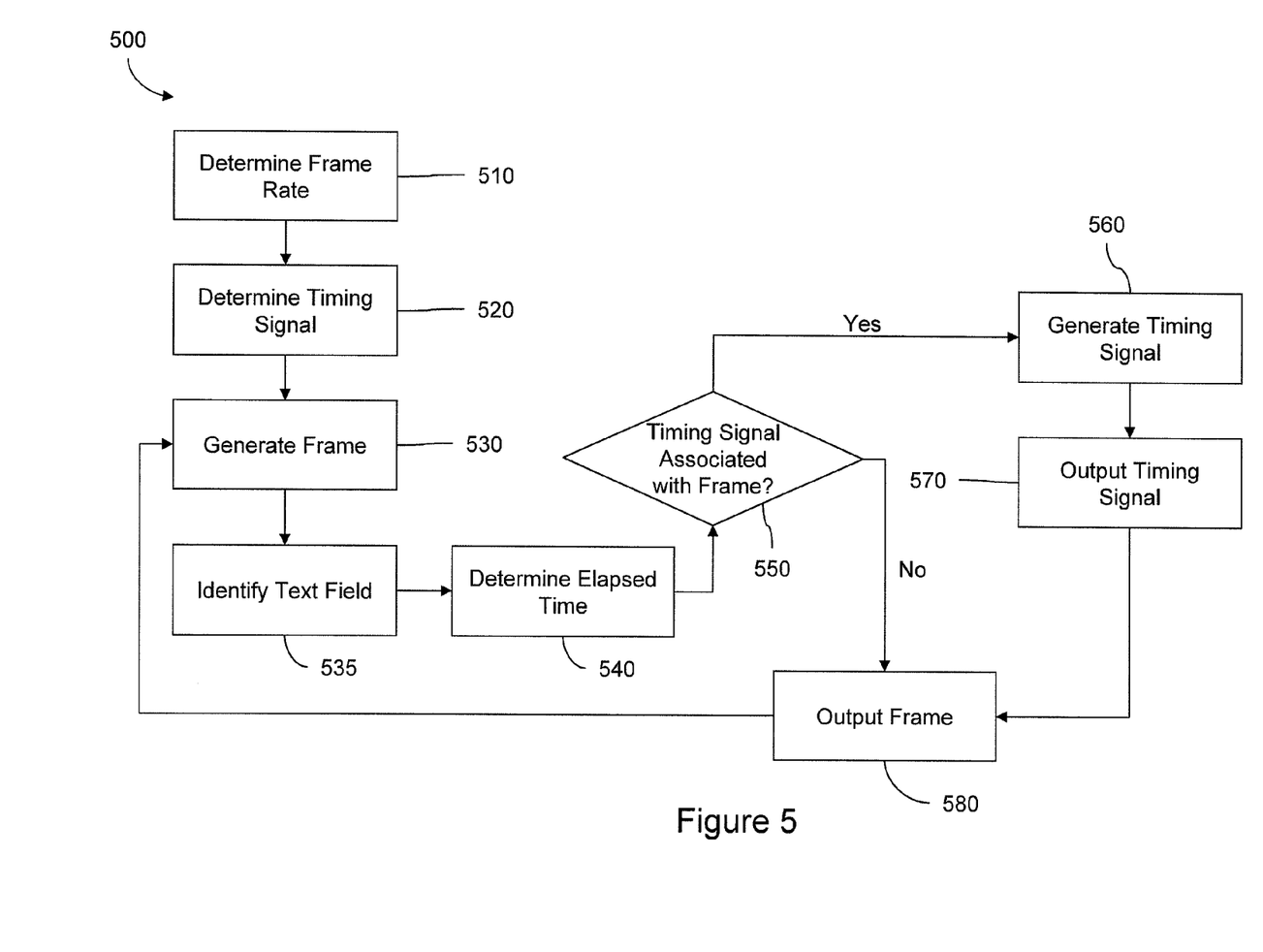
FIG. 5 shows a flowchart describing a method for accelerated playback of a rich internet application according to one embodiment of the present invention.

FIG. 5 shows a method for accelerated playback of a rich internet application according to one embodiment of the present invention.

In block 510, the system 300 determines a frame rate of a RIA as described above with respect to block 410 of FIG. 4. In the embodiment shown, the RIA comprises one animation; however, embodiments may comprise RIAs having a plurality of animations as described above. In such embodiments, the method shown in FIG. 5 may be applied to each animation.

In block 520, the system 300 determines at least one timing signal to be generated by the application. In the embodiment shown in FIG. 5, the system identifies a timing signal associated with the RIA. For the timing signal, the system 300 determines the type of timing signal and at what interval (for a periodic timing signal), or at what time (for a one-time timing signal), the timing signal should be generated and output. The system 300 stores the interval or time at which to generate and output the timing signal.

In block 530, the system 300 generates a frame of the animation as described above with respect to block 440 of FIG. 4. In block 535, the system 300 identifies at least one text field in the generated frame as described above with respect to block 445 of FIG. 4. It should be noted that block 535 is not necessary to the method shown in FIG. 5, but may be useful in one or more embodiments of the present invention.

In block 540, the system 300 determines an elapsed time based at least in part on the frame rate. For example, in one embodiment, the system 300 may maintain a running counter indicating the elapsed time. In such an embodiment, the system may increment the counter by an amount approximately equal to the time between frames based at least in part on the frame rate. For example, in one embodiment, the RIA may specify a frame rate of 30 fps. In such an embodiment, the system 300 may set the counter to 0 after generating the first frame. After generating the second frame, the system 300 may increment the counter by 33.3 ms. The system 300 may thus be able to maintain an elapsed time counter that represents the time that would have elapsed had the animation been run at the specified frame rate.

In block 550, the system 300 determines whether a timing signal is associated with the frame. In the embodiment shown in FIG. 5, the system may determine whether a timing signal is associated with the frame based at least on the elapsed time and the timing signal. For example, the system divides the elapsed time by the period and if the result is an integer, the system determines that the timing signal is associated with the frame. Alternatively, the system may calculate the modulo of the elapsed time and the timing signal interval. For example, if the elapsed time is 1500 ms and the timing signal has a period of 500 ms, the system 300 may calculate 1500 mod 500. If the result is 0, the system 300 determines that the timing signal is associated with the frame.

In some embodiments or for some frame rates or timing signal periods, the timing signal may not exactly align with a frame. For example, if a frame rate is 30 fps and a timing signal has a period of 250 ms, a timing signal may fall at a time between frames. In such a case, frame 8 of the animation occurs after 233.3 ms and frame 9 may occur after 266.6 ms, while a timing signal should be generated after 250 ms. In such an embodiment, the system 300 may elect to generate the timing signal with either frame 8 or frame 9, but not both. For example, a RIA player may allow a timing signal to be generated early, but not late. In such a case, the system 300 may generate the timing signal with frame 8.

If a timing signal is associated with the frame, the method proceeds to block 560. If a timing signal is not associated with the frame, the method proceeds to block 580.

In block 560, the system 300 generates a timing signal as described above with respect to block 460 in FIG. 4. In block 570, the system 300 outputs a timing signal as described above with respect to block 470 in FIG. 4.

In block 580, the system 300 outputs the frame as described above with respect to block 480 in FIG. 4.

Figure 6:
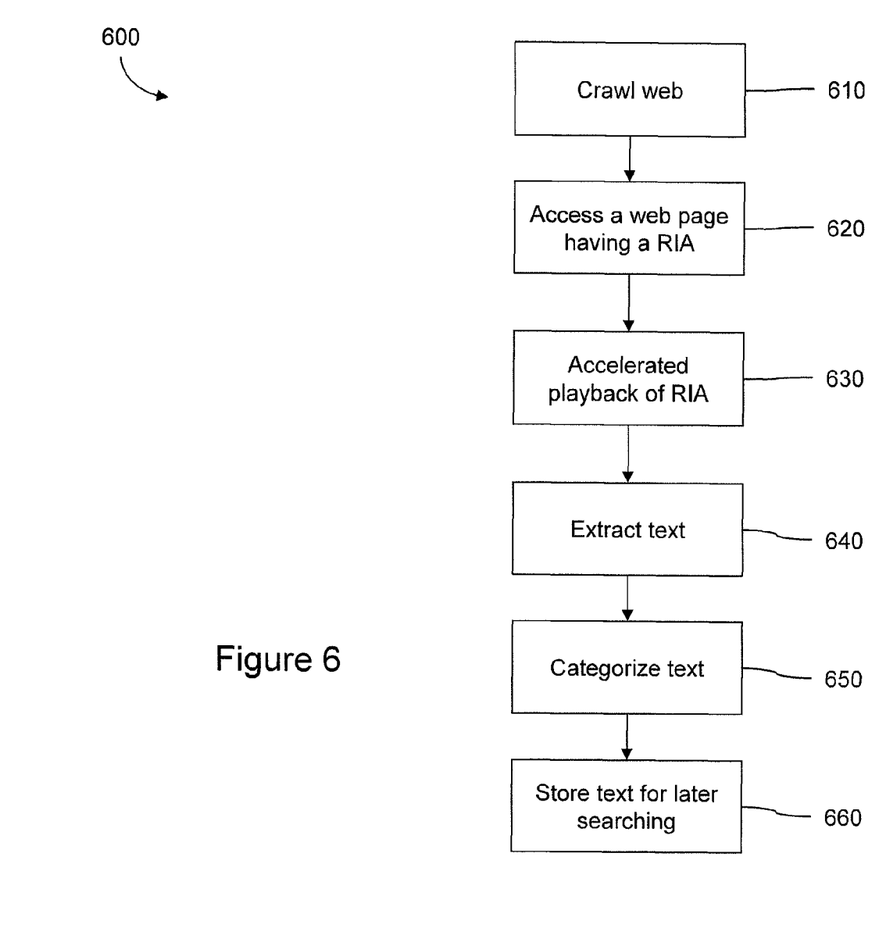
FIG. 6 shows a flowchart describing a method for accelerated playback of a rich internet application according to one embodiment of the present invention.

FIG. 6 shows a flowchart describing a method for accelerated playback of a rich internet application according to one embodiment of the present invention. In block 610, the method begins with crawling the World Wide Web. For example, in one embodiment of the present invention a system, such as a search engine, crawls the World Wide Web (WWW) to find and index web pages.

In block 620 a web page is received during the web crawl. For example, in one embodiment of the present invention, a search engine may access a web page within a web site, and the web page includes a RIA. The search engine may analyze text fields within the web page for words or phrases to be catalogued for generating search results. The search engine may also attempt to search the RIA for content to be catalogued.

In block 630, the RIA is played at an accelerated rate. For example, in one embodiment of the present invention, block 630 comprises the method shown in FIG. 4. In another embodiment of the present invention, block 630 comprises the method shown in FIG. 5.

In block 640, text fields are identified within one or more frames of the RIA, and text within one or more of the text fields is extracted. For example, in one embodiment of the present invention, a search engine identifies text fields within one or more frames of the RIA and extracts text from the text fields In block 650, the text extracted from the text fields is categorized. For example, in one embodiment of the present invention, a search engine determines at least one category associated with the text extracted from text fields within the RIA.

In block 660, the text that has been categorized is stored to be used for generating search results. For example, the search engine may store the text within a database according to an associated category.

Referring again to FIG. 3, embodiments of the present invention can be implemented in digital electronic circuitry, or in computer hardware, firmware, software, or in combinations of them. In one embodiment, a computer 301 may comprise a processor 310 or processors. The processor 310 comprises a computer-readable medium, such as a random access memory (RAM) coupled to the processor. The processor 310 executes computer-executable program instructions stored in memory 320, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may be used, such as a router, private or public network, or other transmission device that comprises some form of computer-readable medium. The processor, and the processing, described may be in one or more structures, and may be dispersed through one or more structures. The processor may comprise code for carrying out one or more of the methods (or parts of methods) described herein.

GENERAL

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A system comprising:
a memory;
a database comprising categorized search terms;
a network interface; and
a processor in communication with the memory, the database and the network interface, the processor configured to:
  perform a web crawl to identify a plurality of rich internet applications for indexing;
  retrieve the plurality of rich internet applications; and
  for each rich internet application:
    determine a frame rate associated with the rich internet application, the rich internet application comprising a plurality of frames,
    determine at least one timing signal to be generated by the rich internet application,
    determine at least one frame of the plurality of frames at which the at least one timing signal would be output at the frame rate,
    generate each of the plurality of frames of the rich internet application at a rate greater than the frame rate,
    output the at least one timing signal when the at least one frame associated with the timing signal is generated,
    after generating each frame:
      parse the generated frame to identify at least one text field associated with the generated frame; and
      extract text from the at least one text field; and
    store an association between the extracted text and the rich internet application in the database.

2. The system of claim 1, wherein the processor is further configured to categorize the extracted text for searching.

3. The system of claim 1, wherein the rate is as fast as possible.

4. The system of claim 1, wherein the rate comprises a fixed rate having a multiple of the frame rate.

5. The system of claim 1, wherein the processor is further configured to categorize the extracted text for searching.

6. The system of claim 1, wherein at least one of the rich internet applications comprises a tree having at least two branches, the tree describing the order of the plurality of frames.

7. The system of claim 6, wherein the processor is further configured to generate each of the plurality of frames of the at least one rich internet application by generating each of the plurality of frames in a depth-first order based at least in part on the tree.

8. The system of claim 6, wherein the processor is further configured to generate each of the plurality of frames of the at least one rich internet application by generating each of the plurality of frames in a breadth-first order based at least in part on the tree.

9. The system of claim 1, wherein at least on of the rich internet applications comprises an application in SWF format.

10. A method comprising:
performing a web crawl to identify a plurality of rich internet applications for indexing;
retrieving the plurality of rich internet applications; and
for each rich internet application:
determining a frame rate associated with the rich internet application, the rich internet application comprising a plurality of frames,
determining at least one timing signal to be generated by the rich internet application,
determining at least one frame of the plurality of frames at which the at least one timing signal would be output at the frame rate,
generating each of the plurality of frames of the rich internet application at a rate greater than the frame rate,
outputting the at least one timing signal when the at least one frame associated with the timing signal is generated,
after generating each frame:
parsing the generated frame to identify at least one text field associated with the generated frame; and
extracting text from the at least one text field; and
storing an association between the extracted text and the rich internet application in the database.

11. The method of claim 10, wherein the rate is as fast as possible.

12. The method of claim 10, further comprising categorizing the extracted text for searching.

13. The method of claim 10, wherein at least one of the rich internet applications comprises a tree having at least two branches, the tree describing the order of the plurality of frames.

14. The method of claim 13, wherein generating each of the plurality of frames of the at least one rich internet application comprises generating each of the plurality of frames in a depth-first order based at least in part on the tree.

15. The method of claim 13, wherein generating each of the plurality of frames of the at least one rich internet application comprises generating each of the plurality of frames in a breadth-first order based at least in part on the tree.

16. The method of claim 10, wherein the rate comprises a fixed rate having a multiple of the frame rate.

17. The method of claim 10, wherein the rate is as fast as possible.

18. The method of claim 10, wherein at least one of the rich internet applications comprises an application in SWF format.

19. A non-transitory computer-readable medium on which is encoded computer code configured to cause a processor to execute a method comprising:
performing a web crawl to identify a plurality of rich internet applications for indexing;
retrieving the plurality of rich internet applications; and
for each rich internet application:
determining a frame rate associated with the rich internet application, the rich internet application comprising a plurality of frames,
determining at least one timing signal to be generated by the rich internet application,
determining at least one frame of the plurality of frames at which the at least one timing signal would be output at the frame rate,
generating each of the plurality of frames of the rich internet application at a rate greater than the frame rate,
outputting the at least one timing signal when the at least one frame associated with the timing signal is generated,
after generating each frame:
parsing the generated frame to identify at least one text field associated with the generated frame; and
extracting text from the at least one text field; and
storing an association between the extracted text and the rich internet application in the database.

20. The computer-readable medium of claim 19, wherein the rate is as fast as possible.

21. The computer-readable medium of claim 19, wherein at least one of the rich internet applications comprises a tree having at least two branches, the tree describing the order of the plurality of frames.

22. The computer-readable medium of claim 21, wherein generating each of the plurality of frames of the at least one rich internet application comprises generating each of the plurality of frames in a depth-first order based at least in part on the tree.

23. The computer-readable medium of claim 21, wherein generating each of the plurality of frames of the at least one rich internet application comprises generating each of the plurality of frames in a breadth-first order based at least in part on the tree.

24. The computer-readable medium of claim 19, wherein the rate comprises a fixed rate having a multiple of the frame rate.

25. The computer-readable medium of claim 19, wherein the rate is as fast as possible.

26. The computer-readable medium of claim 19, wherein the rich internet application comprises a Flash™ application.

* * * * *